United States Patent
Vetter

[11] Patent Number: 5,873,453
[45] Date of Patent: Feb. 23, 1999

[54] APPARATUS FOR TRANSFERRING PACKETS OF ROD-SHAPED SMOKERS' PRODUCTS

[75] Inventor: Jürgen Vetter, Hamburg, Germany

[73] Assignee: Topack Verpackungstechnik GmbH, Schwarzenbek, Germany

[21] Appl. No.: 684,952

[22] Filed: Jul. 19, 1996

[30] Foreign Application Priority Data

Aug. 1, 1995 [DE] Germany ............... 195 28 200.0

[51] Int. Cl.[6] .............. B65G 29/00; B65G 37/00; B65G 47/84
[52] U.S. Cl. .............. 198/468.8; 198/468.01; 198/478.1; 198/704
[58] Field of Search ............ 198/469.01, 468.8, 198/478.1, 704

[56] References Cited

U.S. PATENT DOCUMENTS

| | | | |
|---|---|---|---|
| 2,180,163 | 11/1939 | Milmoe | 198/24 |
| 2,740,541 | 4/1956 | Ashford | 198/468.8 |
| 2,760,620 | 8/1956 | Hull et al. | 198/478.1 |
| 3,411,616 | 11/1968 | Smith | 198/468.8 |
| 3,967,543 | 7/1976 | Seragnoli | 493/94 |
| 3,977,157 | 8/1976 | Davies | 53/207 |
| 4,134,502 | 1/1979 | Seragnoli | 214/6 BA |
| 4,144,695 | 3/1979 | Seragnoli | 53/234 |
| 4,388,989 | 6/1983 | Edmunds | 198/339 |
| 4,768,639 | 9/1988 | Gamberini et al. | 198/468.8 |
| 4,790,115 | 12/1988 | Focke | 53/234 |
| 4,823,536 | 4/1989 | Manservigi et al. | 53/466 |
| 5,163,268 | 11/1992 | Vaccari et al. | 53/397 |

FOREIGN PATENT DOCUMENTS

| | | | |
|---|---|---|---|
| 73394 | 6/1960 | France | 198/468.8 |
| 2 218 247 | 9/1974 | France . | |
| 1 013 482 | 1/1958 | Germany . | |
| 1 251 224 | 9/1967 | Germany . | |
| 2447917 | 7/1975 | Germany . | |
| 28 40 850 | 4/1979 | Germany . | |
| 3627912 | 2/1988 | Germany . | |
| 37 39 579 A 1 | 6/1988 | Germany . | |
| 3742791 | 7/1988 | Germany . | |
| 4039133 | 6/1991 | Germany . | |
| 42 25 062 C 2 | 8/1995 | Germany . | |
| 699448 | 11/1953 | United Kingdom . | |

*Primary Examiner*—Karen M. Young
*Assistant Examiner*—Thuy V. Tran
*Attorney, Agent, or Firm*—Spencep & Frank

[57] ABSTRACT

Apparatus for transferring at least partially finished packets containing cigarettes or other rod-shaped smokers' products from a lower level, where the packets are advanced along a horizontal path toward a stationary transfer station, into the receptacles of a rotary indexible conveyor at a higher level, has an elevator with two superimposed components which clamp a packet during lifting from the lower level to the conveyor. A packet which is in the process of advancing to or has reached the upper level is engaged by one of several holders which are associated with the receptacles and hold the adjacent packets against undesirable displacement, at least during the initial stage of indexing of such packets from the transfer station.

16 Claims, 7 Drawing Sheets

APPARATUS FOR TRANSFERRING PACKETS OF ROD-SHAPED SMOKERS' PRODUCTS

BACKGROUND OF THE INVENTION

The invention relates to improvements in apparatus for transferring commodities between different levels, especially for transferring at least partially finished packets containing arrays of articles of the tobacco processing industry from a first level where the packets or analogous accumulations of plain or filter cigarettes, cigars or cigarillos or other rod-shaped articles or products of the tobacco processing industry are supplied to a stationary transfer station, to a second level at which successively transferred articles are indexed about a fixed axis, e.g., about a vertical axis.

It is customary to assemble packets of cigarettes or other rod-shaped articles of the tobacco processing industry (hereinafter simply referred to as cigarettes for short but with the understanding that analogous procedures can be resorted to in connection with the manipulation of filter cigarettes, plain or filter cigars, plain or filter cigarillos and/or any other rod-shaped articles of the tobacco processing industry) while the cigarettes are being assembled into arrays (of, for example, twenty parallel cigarettes each) and are transported between a series of successive treating stations at which the making of the packets is carried out and completed. The making of packets can involve the delivery of one or more blanks from suitable source or sources of supply, draping the blanks around the arrays of rod-shaped articles, sealing the blanks, insertion of coupons or the like, the application of light-transmitting outer wrappers and, if necessary, additional procedures.

The advancement of arrays of cigarettes from treating station to treating station is determined by the nature of the transferring instrumentalities, by the nature of treatment at a particular station, and by the sensitivity of the articles forming the arrays and/or other parameters. It has been found that the transfer of arrays, with or without partially completed or finished packets, is often slowed down owing to the required direction and/or nature of transfer from a preceding station to the next-following station. This can result in the establishment of bottlenecks, i.e., in a slowing down of the operation of an entire production line, e.g., a production line including one or more cigarette makers, one or more makers of filter rod sections, one or more filter tipping machines wherein plain cigarettes are united with filter rod sections to form therewith filter cigarettes of unit length or multiple unit length, one or more packing machines wherein arrays of filter cigarettes are introduced into packets (e.g., into hinge lid packets), one or more cellophaning machines, one or more carton filling machines, and one or more carton crating and strapping machines. Even minor improvements in the rate of advancement of arrays of cigarettes, with partially completed or finished packets, can entail huge increases in the output of such production lines.

Certain types of presently known apparatus for transferring packets of rod-shaped smokers' products and/or analogous or similar commodities are disclosed, for example, in British patent specification No. 699,448 published Nov. 4, 1953, in German patent No. 42 25 062 C2 published Aug. 17, 1995, in German patent No. 1 013 482 published Jan. 23, 1958, in German Auslegeschrift No. 1 251 224 published Sep. 28, 1967, in German patent application No. 28 40 850 published Apr. 5, 1979, and in German patent application No. 37 39 579 A1 published Jun. 23, 1988.

OBJECTS OF THE INVENTION

An object of the invention is to increase the output of machines or production lines wherein accumulations of articles of the tobacco processing industry are manipulated preparatory to and/or during confinement in packets or analogous containers.

Another object of the invention is to provide an apparatus for the transfer of at least partially finished packets of rod-shaped articles of the tobacco processing industry between different levels at which the packets are conveyed at different speeds, in different directions and/or at different frequencies.

A further object of the invention is to change the direction of advancement of packets for arrays of plain or filter cigarettes or other rod-shaped articles of the tobacco processing industry at a heretofore unmatched frequency.

An additional object of the invention is to provide an apparatus which is designed for gentle treatment of cigarette packets during transfer between different levels with simultaneous changes in the rate and/or direction of advancement of the packets.

Still another object of the invention is to provide an apparatus which exhibits the above-enumerated features and advantages and can be incorporated in existing machines or production lines for the making of packets of cigarettes or other rod-shaped articles of the tobacco processing industry.

Another object of the invention is to provide the above outlined apparatus with novel and improved means for maintaining packets or analogous accumulations of rod-shaped articles of the tobacco processing industry in optimum positions during transfer between different levels and during changes in the direction of transport of the packets.

SUMMARY OF THE INVENTION

The invention is embodied in an apparatus for transferring at least partially confined accumulations of articles of the tobacco processing industry (such as at least partially completed packets containing arrays of parallel plain or filter cigarettes, cigars or cigarillos) between a stationary transfer station at a first level and the receptacles (e.g., pockets or cells) of an indexible conveyor at a different second level. The improved apparatus comprises an elevator having components for moving successive accumulations of a series of accumulations from the first level to the second level and for temporarily retaining each accumulation at the second level in a receptacle of the conveyor for a first interval of time, and means for holding the accumulations at the second level in the respective receptacles of the conveyor for second intervals of time upon completion of temporary retention of moved accumulations by the components of the elevator.

The second level is or can be disposed above the first level.

The elevator is located at the stationary transfer station, and the conveyor is indexible at the second level, preferably above the first level, to advance successive receptacles of a group of receptacles to a position of at least substantial alignment with and above the transfer station. The means for holding can include supports which are indelible with the conveyor, and means for displacing the supports relative to the conveyor to and from positions beneath the respective receptacles. At least one support is or can be provided for each receptacle of the indelible conveyor.

In accordance with a presently preferred embodiment, the components of the elevator include upper and lower components, and an accumulation which is being moved from the first level to the second level is located between and is or can be at least temporarily clamped by the upper and lower components, at least during the respective first interval.

The apparatus preferably further comprises means for advancing successive accumulations of the series of accumulations to the transfer station at the first level. Such advancing means can comprise a support which defines a path leading to the transfer station and having at the transfer station at least one opening for one component of the elevator. The support can include a platform which defines for the accumulations an at least substantially horizontal path, and the advancing means can further comprise means for pushing successive accumulations of the series along the at least substantially horizontal path to the transfer station. The means for advancing or pushing can comprise a reciprocable pusher.

One component of the elevator can include means for engaging a first portion of an accumulation at the transfer station, and the holding means of such apparatus can include means for engaging a second portion of an accumulation in the respective receptacle at the second level. The first and second portions of the accumulation at the station are or can be adjacent each other, and the first portion of such accumulation is or can be larger than the second portion.

The apparatus can further comprise a stationary mouthpiece for the accumulation at the transfer station, and the receptacles are indexible at the second level into and from positions of registry or alignment with the transfer station and the mouthpiece.

A presently preferred elevator is constructed and assembled in such a way that its components include a first component which is movable at the transfer station between the first and second levels to lift an accumulation from the first level into a receptacle at the second level in response to an upward movement from the first level to the second level, and a second component which is disposed above the first component. At least one of the first and second components is movable toward and away from the other of the first and second components to clamp an accumulation between the first and second components in response to a movement of the at least one component toward the other component. The arrangement can be such that the first and second components of the elevator are movable toward and away from each other. Such first and second components can be provided with confronting surfaces (e.g., with parallel plane surfaces) which serve to engage an accumulation from above and from below while such accumulation is being clamped by the elevator.

The components of the elevator can include a component (e.g., a flap, a lever or the like) which is movable relative to a receptacle at the transfer station to clamp an accumulation in such receptacle.

The novel features which are considered as characteristic of the invention are set forth in particular in the appended claims. The improved transferring apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
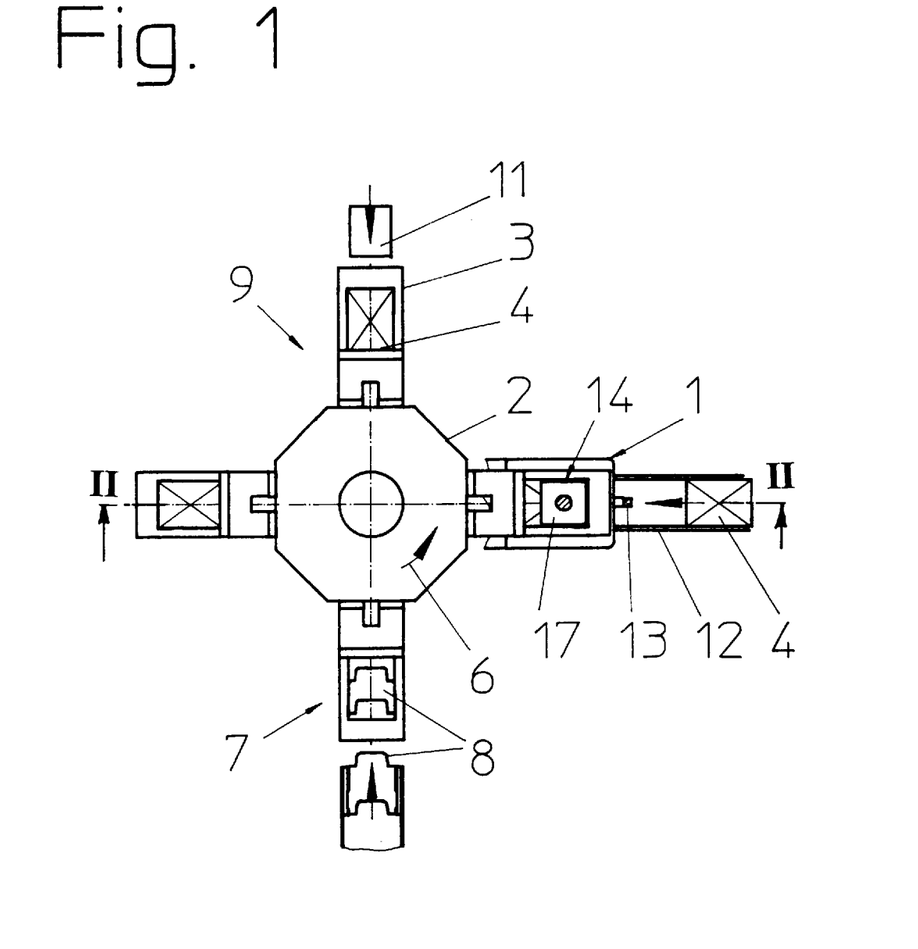
FIG. 1 is a fragmentary plan view of an apparatus which embodies one form of the invention, with a portion of the elevator shown in a horizontal sectional view, the indexible conveyor which is shown in FIG. 1 forming part of a machine for packing arrays of cigarettes or other rod-shaped articles of the tobacco processing industry.
Figure 2:
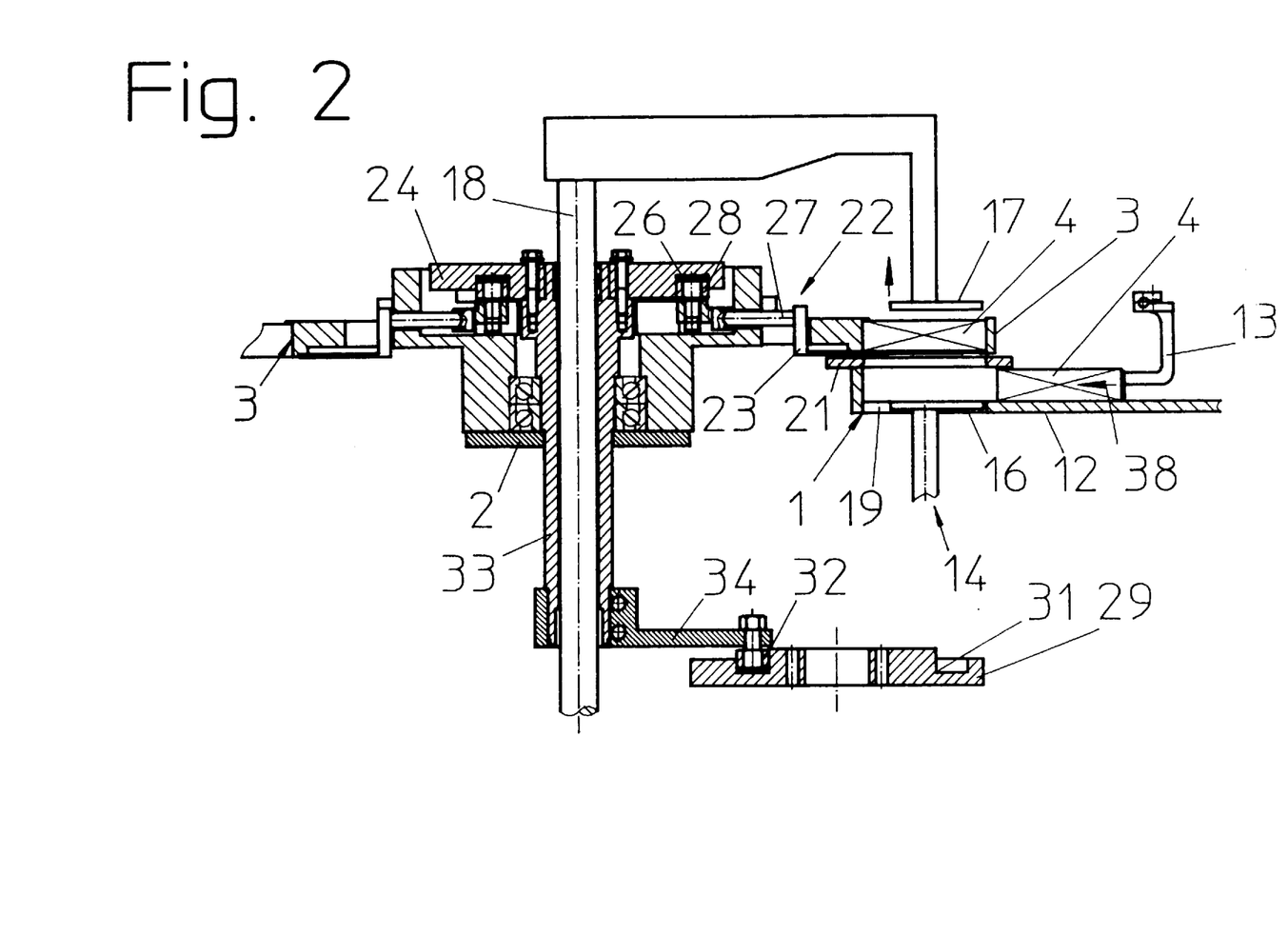
FIG. 2 is an enlarged vertical sectional view substantially as seen in the direction of arrows from the line II—II in FIG. 1.
Figure 3:
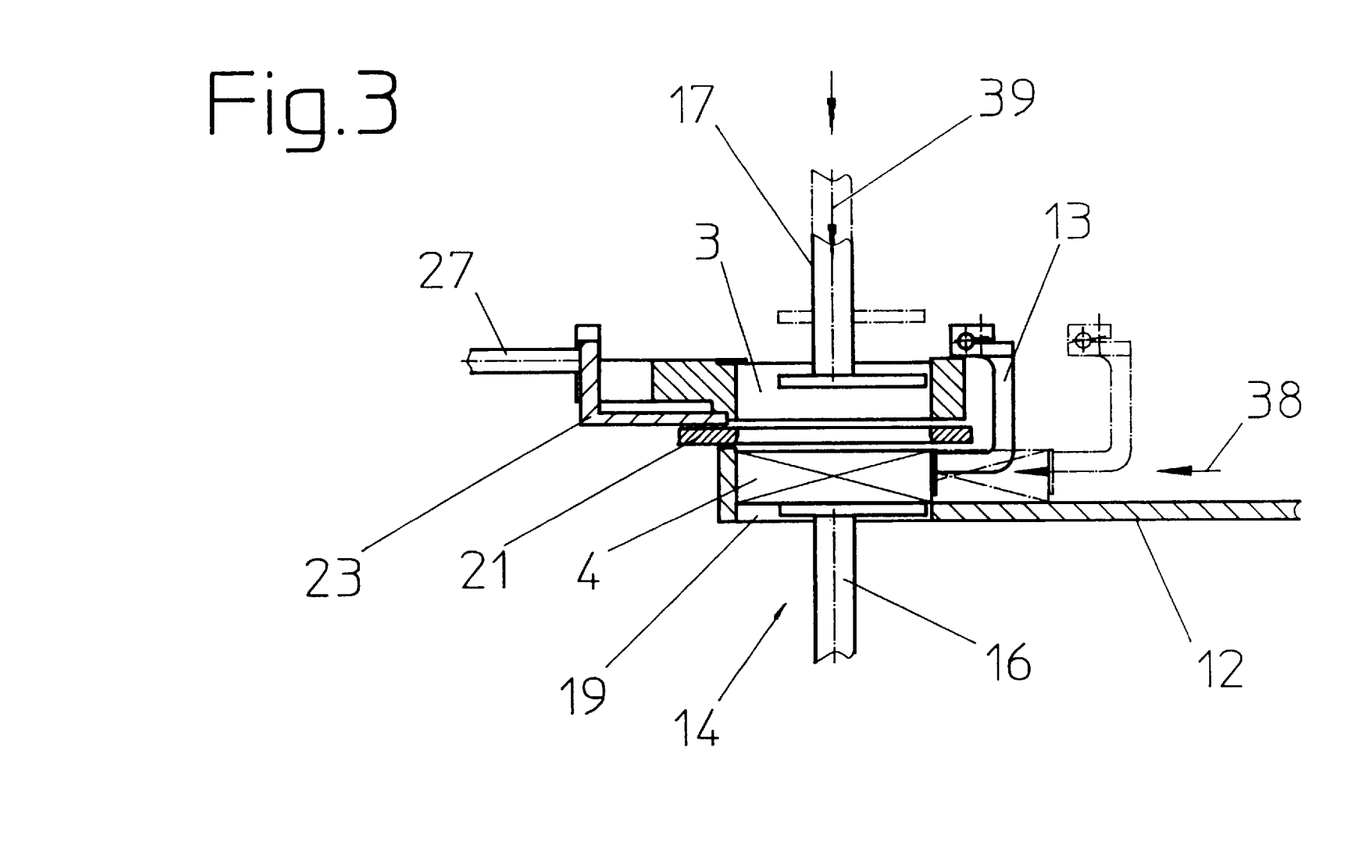
FIG. 3 is an enlarged view of a detail in FIG. 2, showing a packet on the platform at the transfer station.

The apparatus which is shown in FIGS. 1 to 3 comprises means for advancing successive accumulations (e.g., packets) 4 of a series of such accumulations along a preferably horizontal path toward a stationary transfer station 1. The advancing means comprises a stationary platform 12 and suitable means for pushing successive accumulations 4 (hereinafter called packets for short) of the series of such accumulations in the direction of the arrow 38 toward and into the station 1. The illustrated means for pushing includes a pusher 13 which is reciprocable in and counter to the direction indicated by the arrow 38 and which is also pivotable about a horizontal axis so that it can be caused to advance over a packet 4 on the platform 12 during movement in a direction away from the station 1.

The platform 12 and the transfer station 1 are located at a level below the level of a rotary conveyor 2 which is indexible about a vertical axis and comprises four equidistant receptacles 3 in the form of cells or pockets. Each such receptacle 3 can receive one packet 4 at a time, and indexing of the conveyor 2 results in stepwise advancement of receptacles 3 to and beyond one, two or more treating or processing locations or stations. The direction of indexing of the conveyor 2 (in a manner forming no part of the present invention) is indicated by the arrow 6. FIG. 1 shows a treating location 7 at which successive empty receptacles 3 of the conveyor 2 receive suitable blanks 8 to be incorporated into or otherwise combined with the packets 4 arriving along the horizontal path defined by the platform 12 and being lifted at the station 1 from the level of the platform to a higher level, namely into the receptacle 3 which is then maintained in a position of accurate registry or alignment with the station 1.

A freshly filled receptacle 3 which has been indexed by a step beyond the transfer station 1 reaches a location or station 9 where the packet 4 therein is caused to receive (e.g., by bonding or in any other suitable way) a coupon 11 or another suitable insert. The sources of blanks 8 and inserts 11 are not shown in the drawings, and the exact nature of the parts 8, 11 and/or the exact mode of introducing such parts into the adjoining receptacles and/or of combining them with the packets 4 forms no part of the present invention.

The apparatus further comprises a conveyor 14 (hereinafter called elevator) which serves to lift successive packets 4 off the platform 12 at the transfer station 1 and to introduce the thus lifted packets into the registering receptacles 3 of the conveyor 2. The elevator 14 which is shown in the drawings comprises a first or lower component 16 which is movable up and down at the transfer station 1 between a lower end position (e.g., that shown in FIG. 2 in which its plane upper side or surface is flush with the upper side of the platform 12) and an upper end position (see FIG. 5) in which a packet 4 resting on the component 16 is located in the receptacle 3 above the transfer station 1. The illustrated elevator 14 further comprises a second or upper component 17 having a plane underside which confronts the upper side of the component 16 and can cooperate with the component 16 to clamp a packet 4 from below and from above during lifting from the level of the platform 12 into the registering receptacle 3 of the conveyor 2.

The platform 12 is provided with an opening or window 19 which is located at the stationary transfer station 1 and provides a passage for the movement of the lower component 16 of the elevator 14 between its upper and lower end positions. The means for moving the component 17 up and down comprises a vertical shaft 18 which further serves to define a vertical rotational axis for the indexible conveyor 2. A second shaft (not referenced) is provided to move the component 16 up and down, preferably in accurate synchronism with up- and down movements of the component 17.

FIGS. 2 to 6 show a stationary mouthpiece or guide 21 which is disposed between the transfer station 1 and the receptacle 3 registering with the components 16, 17 of the elevator 14.

In accordance with a further feature of the invention, the improved apparatus comprises a unit 22 which serves as a means for holding the packets 4 at the level of the receptacles 3 for certain intervals of time beginning not later than when the elevator 14 has lifted a packet 4 from the platform 12 into the registering receptacle above the opening 19. This ensures that the orientation of a packet 4 in its receptacle 3 cannot change before the conveyor 2 is indexed again so as to advance the freshly filled receptacle beyond the station 1 and onto a support for the underside of the pocket in the freshly filled receptacle.

The elevator 14 cooperates with the unit 22 to ensure that each and every packet 4 is reliably maintained in a desired optimum position during each stage of lifting off the platform 12 and during the initial stage of subsequent indexing of the conveyor 2, namely when the propping of a packet 4 in its receptacle 3 is no longer necessary because the packet is supported from below in a different way during indexing to the treating location 9 where the respective receptacle 3 receives an insert 11.

The unit 22 comprises a discrete support 23 for each of the four receptacles 3. As can be seen by comparing the positions of the component 16 and the support 23 shown in FIGS. 4 and 5, each support 23 can be moved to and from an operative or extended position in which it supports from below a relatively small portion of the underside of a packet 4 in the respective receptacle 3, namely a portion smaller than the adjacent portion which is propped from below by the component 16. The two portions which are propped by the upper side of the component 16 and by the upper side of the support 23 for the respective receptacle 3 can jointly constitute the entire underside of a packet 4 which is being transferred from the platform 12 into a receptacle of the conveyor 2.

The means for moving the supports 23 in horizontal planes relative to the respective receptacles 3 comprises a cam 24 which is rockable back and forth about the axis of the shaft 18 and has a suitable cam groove 26 (see particularly FIGS. 7 to 10) for roller followers 28 at the free ends of rods 27 each of which is coupled to or is of one piece with one of the supports 23. The cam 24 receives motion from a further cam 29 having in its upper side a suitably configurated cam groove 31 for a roller follower 32 carried by a lever 34 serving to rock the cam 24 back and forth. The connection between the lever 34 and the cam 24 comprises an upright hollow shaft 33 which surrounds the axially reciprocable shaft 18 of the elevator 14.

The mode of operation of the improved apparatus is as follows:

FIG. 3 shows an empty receptacle 3 above and in accurate alignment with a packet 4 on the platform 12 at the transfer station. The receptacle at the transfer station 1 contains a blank 8 which was picked up at the treating location 7 prior to indexing of the conveyor 2 in the direction of the arrow 6. The cam 24 was rocked by the cam 29 in the direction of arrow 36 (FIG. 7) so that the support 23 for the receptacle 3 then located at the transfer station 1 stands withdrawn (see the arrow 37) to the retracted position shown in FIGS. 3, 4 or 8.

The pusher 13 has completed the advancement of a fresh packet 4 along the upper side of the platform 12 (note the arrows 38 in FIGS. 3 and 7) and to a position above the lower component 16 of the elevator 14 (the component 16 is then maintained at a level such that its upper side is not above the upper side of the platform 12). The upper component 17 of the elevator 14 is on its way toward the lower component 16 (arrow 39 in FIG. 3).

Figure 4:
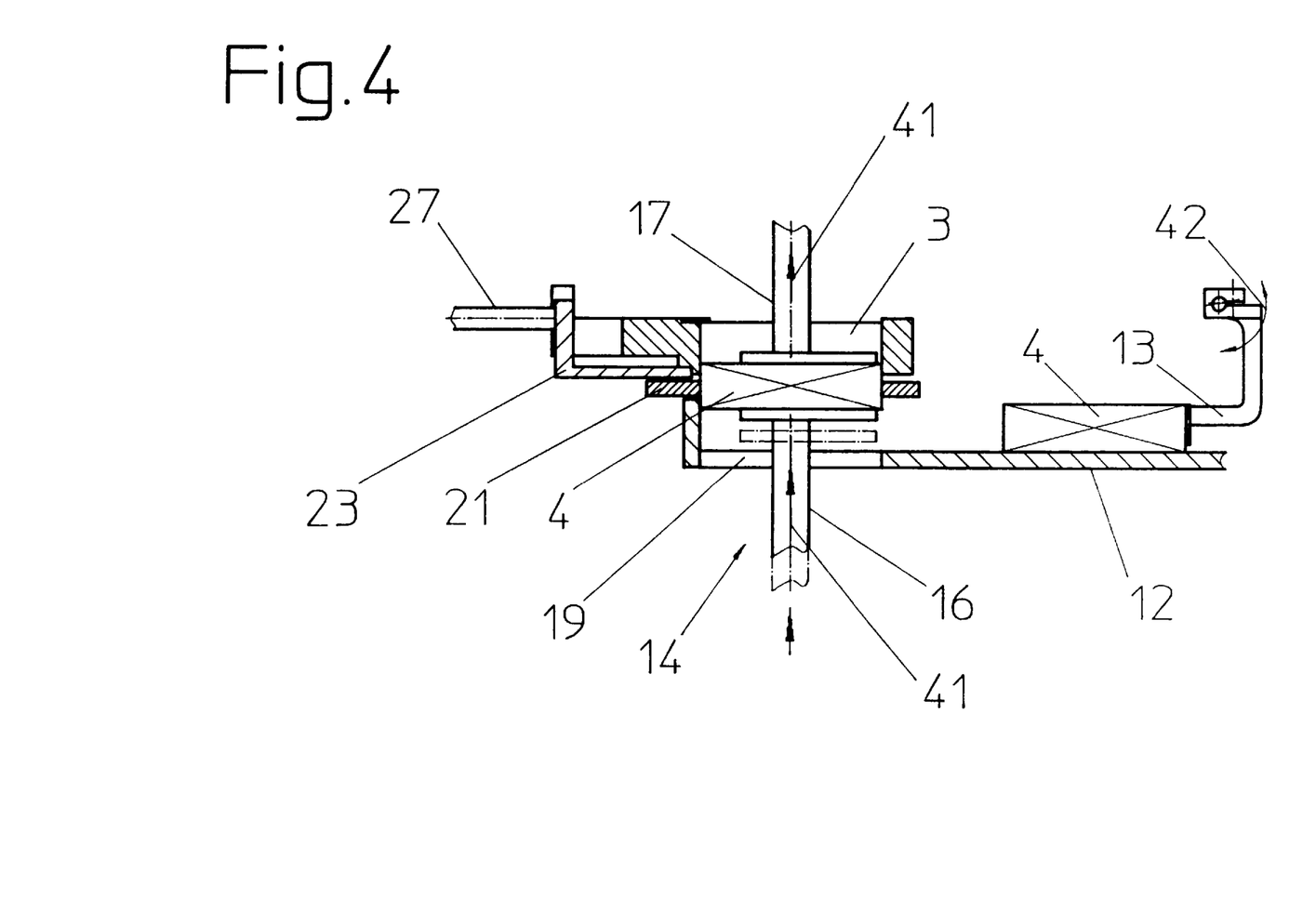
FIG. 4 shows the structure of FIG. 3 but with the packet in the process of being lifted from the platform into an empty receptacle of the indexible conveyor.

The next step involves clamping of the packet 4 at the station 1 between the confronting surfaces of the components 16 and 17. This can be achieved by moving the component 17 further downwardly, by moving the component 16 upwardly or (and as shown in FIG. 4) by moving the component 16 upwardly while the component 17 is caused to move downwardly. Once the packet 4 is reliably clamped between the components 16 and 17, these components are caused to move upwardly as a unit (note the arrows 41 in FIG. 4) so that the packet 4 is lifted off the platform 12 and enters the registering empty receptacle 3 (see FIG. 5). The pusher 13 is pivoted about the aforementioned horizontal axis in one of the directions indicated in FIG. 4 by a double-headed arrow 42 so that it can be retracted away from the station 1 counter to the direction indicated by the arrows 38 at a level above the next-following packet 4 on the platform 12. The thus retracted pusher 13 is pivoted back to the position shown in FIG. 4 so that it is ready to proceed with the advancement of the next-following packet 4 toward and into the transfer station 1.

Figure 5:
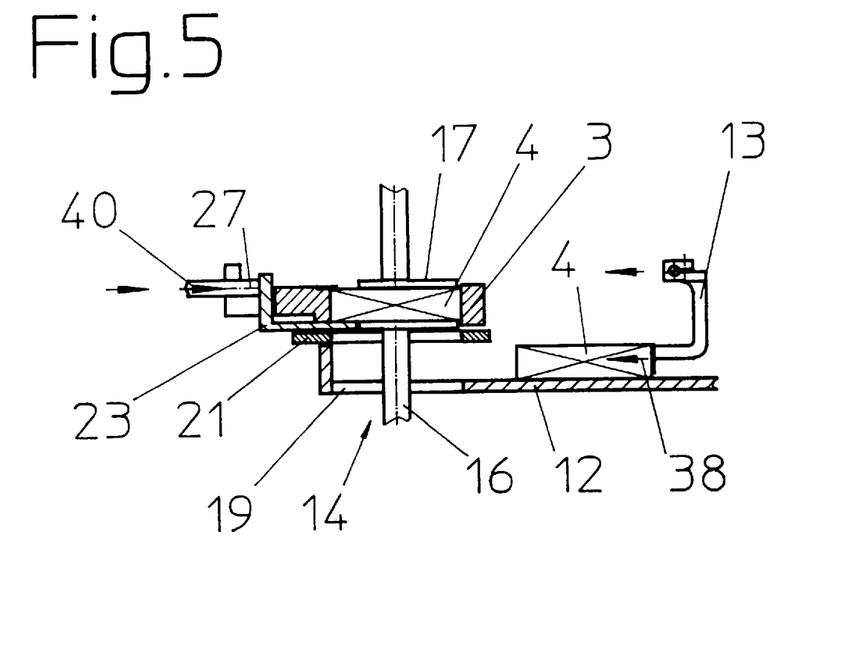
FIG. 5 is a smaller-scale view of the structure of FIG. 4, with the packet shown clamped between the components of the elevator in a receptacle of the indexible conveyor.
Figure 6:
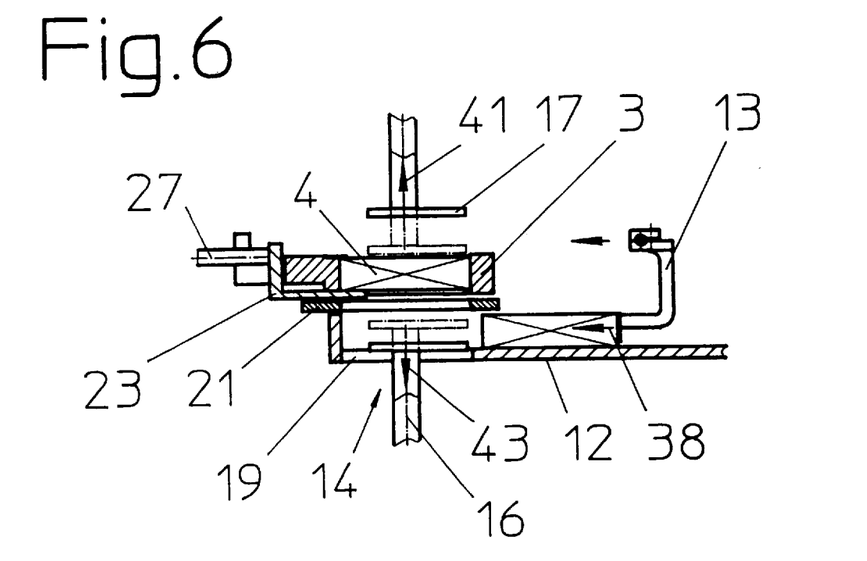
FIG. 6 illustrates the structure of FIG. 5 but with a support in the extended position and with the components of the elevator in the process of being retracted from clamping engagement with a packet in a receptacle of the indexible conveyor.
Figure 7:
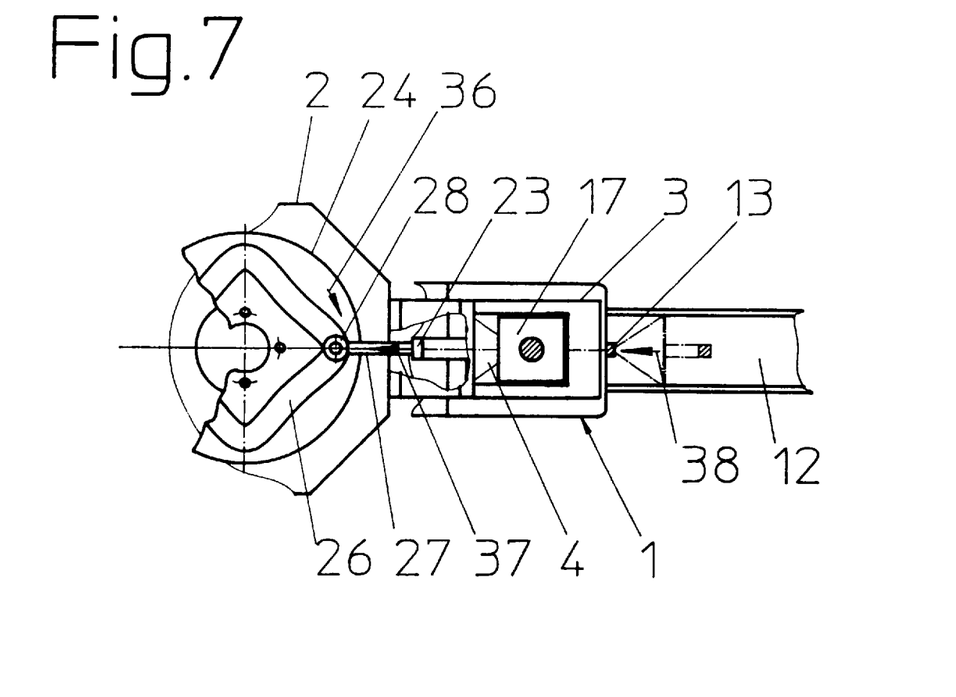
FIG. 7 is an enlarged view of a detail in FIG. 1 and shows one of the supports in the extended or operative position.
Figure 8:
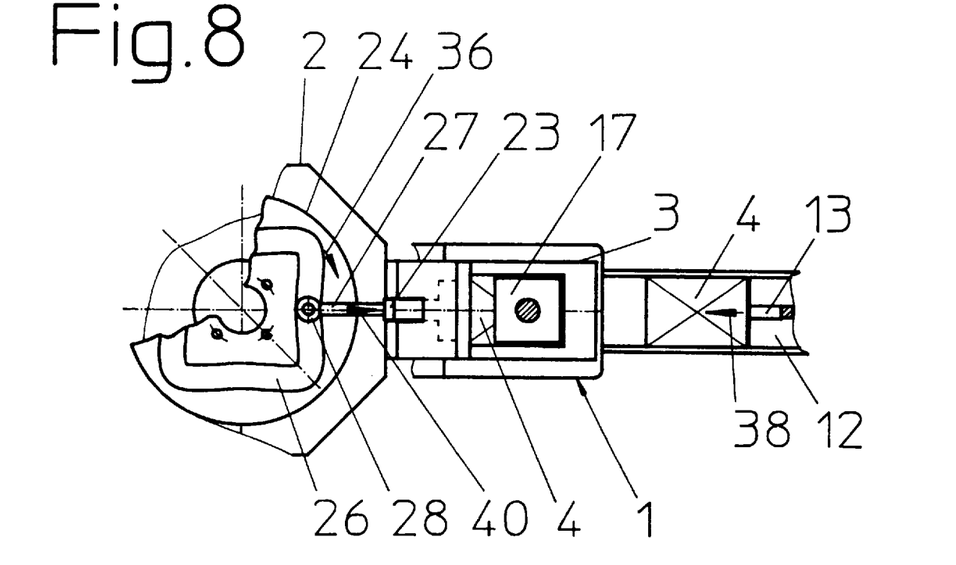
FIG. 8 illustrates the structure of FIG. 7 but with the support at the transfer station in the retracted or inoperative position.
Figure 9:
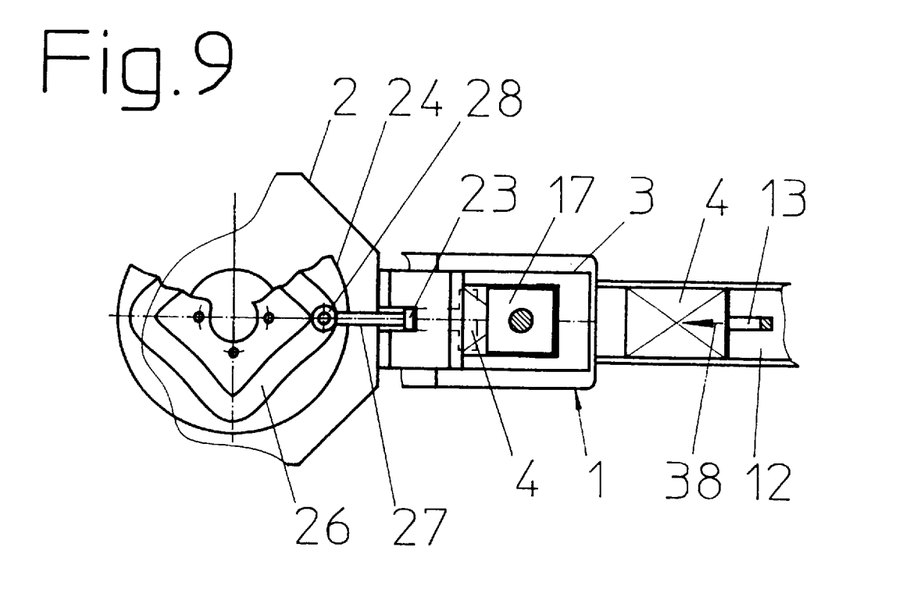
FIG. 9 shows one of the supports in a position corresponding to that of FIG. 7.
Figure 10:
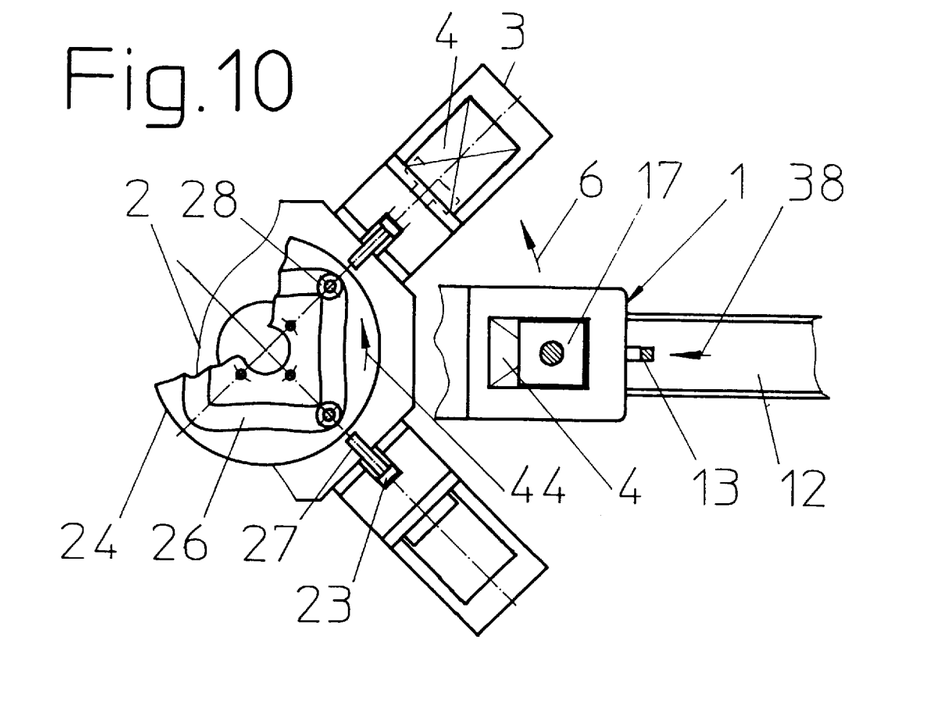
FIG. 10 illustrates the structure of FIGS. 7, 8 or 9 but with the conveyor in the course of an indexing movement to move a freshly filled receptacle from and to advance an empty receptacle to the transfer station.

The cam 24 is caused to turn in the direction which is indicated by the arrow 36 (FIG. 8) so that the support 23 at the transfer station 1 is caused to move beneath the packet 4 in the respective receptacle 3 as soon as the introduction of a packet 4 into such receptacle is completed. This renders it possible to move the components 16 and 17 of the elevator 14 away from each other (note the arrows 41 and 43 in FIG. 6) without risking an undesirable change in the position of the packet 4 in the freshly filled receptacle 3 because such packet is propped from below by the upper side of the respective support 23. The direction of advancement of one of the supports 23 to its operative position is indicated by the arrow 40 which is shown in FIGS. 5 and 8. The area of that portion of the underside of a packet 4 in its receptacle which is engaged by the respective support upon retraction of the components 16, 17 of the elevator 14 is sufficiently large to ensure that one reliably avoids any tilting and/or other undesirable movements of the packet relative to the conveyor 2 before the latter is indexed to an extent necessary to ensure that the packet remains in an optimum position relative to its receptacle without any propping by the respective support 23.

Retraction of the component 17 above and away from the transfer station (arrow 41 in FIG. 6) can be terminated as soon as this component rises above the conveyor 2, i.e., as soon as the component 17 cannot interfere with the indexing of the conveyor. Retraction of the component 16 (arrow 43 in FIG. 6) must proceed until the upper side of the platform 12 is unobstructed so that the pusher 13 can advance the next packet 4 all the way to the station 1. Such packet comes to rest in the space between the retracted components 16, 17 of the elevator 14.

The cam 24 is thereupon rocked in the direction of arrow 44 (FIG. 10) in order to retract the support 23 from the freshly filled receptacle 3 as soon as the propping action of the thus retracted support is no longer necessary.

The next transfer can begin as soon as the indexing of the conveyor 2 by a step is completed, i.e., as soon as an empty receptacle 3 moves to a position of alignment with and above the transfer station. Such receptacle is empty because it does not, as yet, contain a packet 4 but it can contain a blank 8.

An important advantage of the improved apparatus is that the components 16, 17 of the elevator 14 need not support a freshly lifted packet 4 until the very instant when such supporting action is no longer necessary in view of the construction and/or mode of operation of the conveyor 2. Thus, the unit 22 can take over the retaining or propping action during a certain stage of operation of the conveyor 2 immediately following the lifting of a packet 4 from the platform 12 into the then registering empty receptacle. This renders it possible to process larger numbers of packets per unit of time. Furthermore, the packets are treated gently in spite of the high frequency at which they are being lifted above the platform 12 by the elevator 14.

The improved apparatus can be readily incorporated into or combined with existing machines and/or production lines for the packing of cigarettes or other rod-shaped articles of the tobacco processing industry. The apparatus occupies a small amount of space and its operation can be automated to any desired extent.

It is clear that the improved apparatus is susceptible of numerous modifications without departing from the spirit of the invention. For example, the supports 23 can be replaced by or employed jointly with suitable clamping elements in the form of tongs, levers or the like which are caused to move into the interior of the receptacles 3 above the transfer station 1 to reliably engage the packets 4 in the respective receptacles in order to hold such packets against uncontrolled movement relative to the conveyor 2 subsequent to retraction of the components 16, 17 from engagement with the packets but prior to reliable engaging of a packet with a support other than the component 16, at least until the packet reaches a stationary part which props it from below during indexing of the conveyor 2.

Another advantage of the supports 23 or equivalent supports is that they do not interfere with the removal of defective packets 4 from their receptacles downstream of the transfer station, as seen in the direction of the arrow 6, for example, at the transfer location 9.

The drive for the cam 29 can be designed in such a way that it is independent of the means for indexing the conveyor 2.

In each embodiment of the improved apparatus, the cycles involving the lifting of successive packets 4 from the upper side of the platform 12 into the empty receptacles 3 above the transfer station can overlap with the cycles of actuating the supports 23 or analogous supports of the unit 22. This contributes to savings in time and to a higher output of the machine or production line which embodies the improved apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transferring accumulations of articles of the tobacco processing industry and, therefore, such adaptations should and are intended to be comprehended within the meaning and range of equivalence of the appended claims.

What it claimed is:

1. Apparatus for transferring at least partially confined accumulations of articles of the tobacco processing industry between a stationary transfer station at a first level and the receptacles of a conveyor located at a second level above said first level and being indexible at said second level to advance successive receptacles of a group of receptacles to a position of at least substantial alignment with and above said first station, comprising an elevator located at said transfer station and having components for moving successive accumulations of a series of accumulations from said first level to said second level and for temporarily retaining each accumulation at said second level in a receptacle of said conveyor for a first interval of time; and means for holding the accumulations at said second level in the respective receptacles of said conveyor for second intervals of time upon completion of temporary retention of moved accumulations by said elevator, said means for holding including supports indexible with said conveyor, at least one for each of said receptacles, and means for displacing said supports relative to said conveyor to and from positions beneath the respective receptacles.

2. The apparatus of claim 1, wherein said accumulations are at least partially completed packets containing arrays of rod-shaped articles of the tobacco processing industry.

3. The apparatus of claim 1, wherein said components include upper and lower components and one of said accumulations being moved from said first level to said second level is located between and is at least temporarily clamped by said components at least during the respective first interval.

4. The apparatus of claim 1, further comprising means for advancing successive accumulations of said series to said transfer station at said first level, said advancing means comprising a support defining a path leading to said transfer station and having at said station at least one opening for one of said components.

5. The apparatus of claim 4, wherein said support includes a platform defining for the accumulations an at least substantially horizontal path, said means for advancing further comprising means for pushing successive accumulations of said series along said at least substantially horizontal path to said station.

6. The apparatus of claim 5, wherein said means for advancing comprises a reciprocable pusher.

7. The apparatus of claim 1, wherein one of said components includes means for engaging a first portion of an accumulation at said station and each support of said holding means includes means for engaging a second portion of an accumulation in the respective receptacle at said second level.

8. The apparatus of claim 7, wherein said first and second portions of the accumulation at said station are adjacent each other.

9. The apparatus of claim 7, wherein said first portion is larger than said second portion of one of said accumulations at said station.

10. The apparatus of claim 1, further comprising a stationary mouthpiece for the accumulation at said station, said receptacles being indelible at said second level into and from positions of registry with said station and said mouthpiece.

11. The apparatus of claim 1, wherein said components include a first component which is movable at said station between said levels to lift one of said accumulations from said first level into a receptacle at said second level in response to an upward movement from said first level to said second level, and a second component disposed above said first component, at least one of said first and second components being movable toward and away from the other of said first and second components to clamp an accumulation between said first and second components in response to a movement of said at least one component toward said other component.

12. The apparatus of claim 11, wherein said first and second components have confronting surfaces arranged to engage one of said accumulations from below and from above.

13. The apparatus of claim 1, wherein said components include at least one component which is movable relative to the receptacle at said station to clamp one of said accumulations in such receptacle.

14. Apparatus for transferring at least partially confined accumulations of articles of the tobacco processing industry between a stationary transfer station at a first level and receptacles of an indexible conveyor at a second level, comprising an elevator having components for moving successive accumulations of a series of accumulations from said first level to said second level and for temporarily retaining each accumulation at said second level in one of said receptacles of said conveyor for a first interval of time, one of said components including means for engaging a first portion of one of said accumulations at said station; and means for holding the accumulations at said second level in the respective receptacles of said conveyor for second intervals of time upon completion of temporary retention of moved accumulations by said elevator, said holding means including means for engaging a second portion of said accumulation in the respective receptacle at said second level.

15. The apparatus of claim 14, wherein said first and second portions of the accumulation at said station are adjacent each other.

16. The apparatus of claim 14, wherein said first portion is larger than said second portion of said accumulations at said station.

* * * * *

UNITED STATES PATENT AND TRADEMARK OFFICE
CERTIFICATE OF CORRECTION

PATENT NO. : 5,873,453
DATED : February 23, 1999
INVENTOR(S) : Juergen VETTER

It is certified that error appears in the above-identified patent and that said Letters Patent is hereby corrected as shown below:

Title Page: Item [56], the "Attorney, Agent, or Firm" section, delete "Spencep" and insert — -Spencer- -.

Signed and Sealed this

Twenty-eighth Day of March, 2000

Attest:

Q. TODD DICKINSON

*Attesting Officer*   *Commissioner of Patents and Trademarks*